United States Patent Office 3,842,138
Patented Oct. 15, 1974

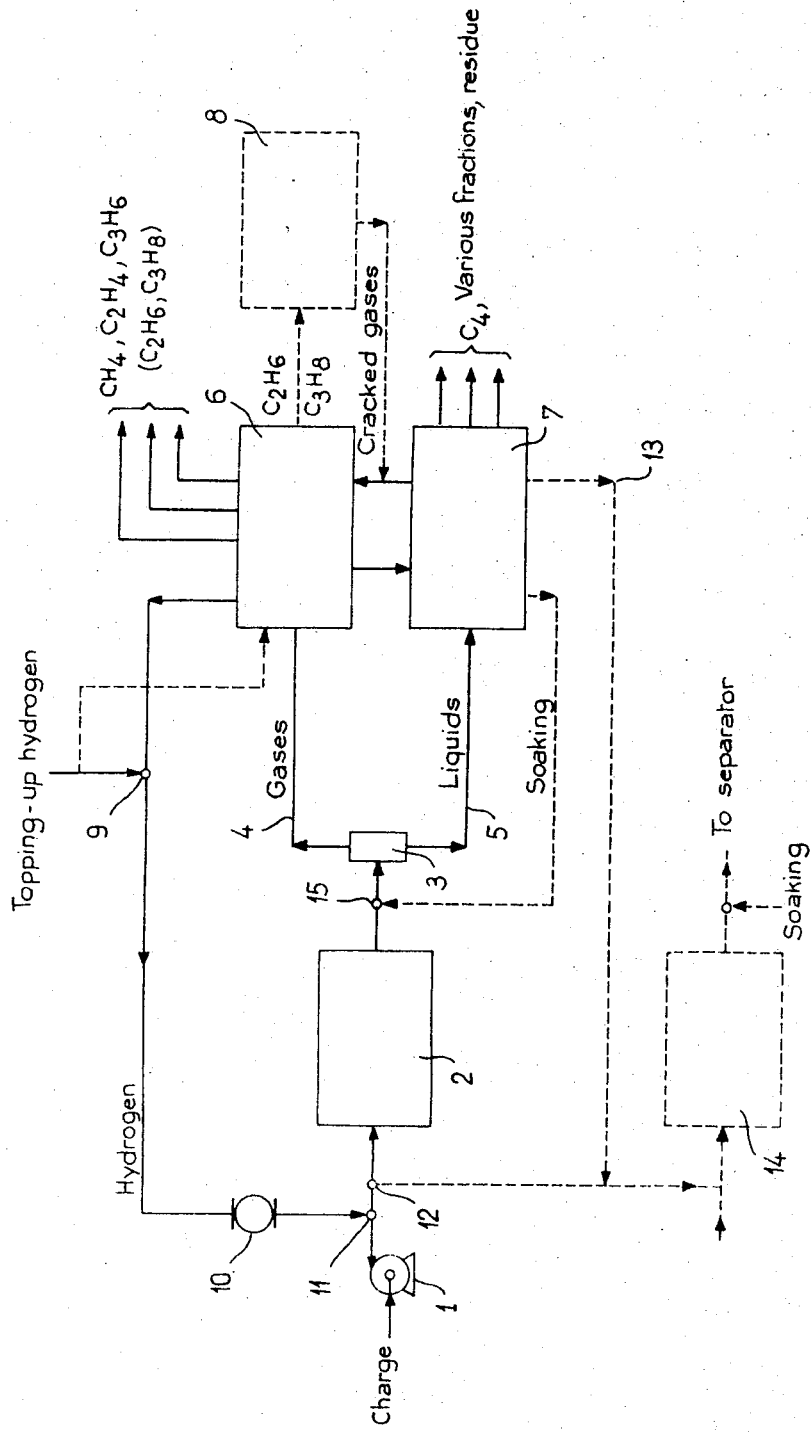

3,842,138
METHOD OF CRACKING HYDROCARBONS UNDER HYDROGEN PRESSURE FOR THE PRODUCTION OF OLEFINS
Edgar Chahvekilian and Jean Marc Plichon, Paris, France, assignors to Pierrefitte-Auby, Paris, France
Filed Dec. 20, 1972, Ser. No. 316,693
Claims priority, application France, Dec. 21, 1971, 7145824; Oct. 24, 1972, 7237583
Int. Cl. C07c 3/40; C10g 13/28
U.S. Cl. 260—683 R          11 Claims

ABSTRACT OF THE DISCLOSURE

A method of thermal cracking in the presence of hydrogen of a charge of hydrocarbons of petroleum or like origin for the purpose of their conversion to products of lower molecular weights in which the olefin constituents are present in large proportions, characterized by the fact that the reaction is carried out with a molar concentration of hydrogen in the effluents of at least 20% at a pressure comprised between 5 and 70 bars, at a temperature higher than 625° C. with times of stay lower than 0.5 second and becoming shorter as the temperature increases, in order to control the hydrogenation for the purpose of limiting the formation of paraffins while preventing coking and reducing the quantity of heat required for the cracking reaction.

---

The object of the present invention is a process for cracking hydrocarbons under pressure in the presence of hydrogen resulting in the direct production of olefins in commercially exploitable quantities.

At present time, various cracking techniques are used to convert a very wide range of petroleum fractions to lighter hydrocarbons, both liquid and gaseous.

One may distinguish:

(a) Conventional cracking, of which various alternatives, thermal and catalytic, have been used for a number of years in the petroleum industry in the conversion of heavy distillates, mainly to light gasolines;

(b) Steam cracking, which is more particularly reserved for the manufacture of olefins from very varied gaseous or liquid feedstocks in the presence of steam and near atmospheric pressure;

(c) Hydrocracking, a technique carried out in the presence of excess hydrogen under pressure, known in certain particular cases as destructive hydrogenation.

The term "hydrocracking" must not be understood in the present case in the restrictive sense which has been given to it in the petroleum industry to designate a number of catalytic processes operating under hydrogen pressure. In its broadest sense, it is applied to all cracking techniques operated in the presence of hydrogen and under pressure, whether catalysts are used or not. In the case of thermal hydrocracking, the temperatures are substantially higher than in the catalytic processes, and under such pyrolytic conditions, the conversion of the charge into gaseous products is higher and may be almost complete, at least as regards the paraffinic hydrocarbons. As for aromatics, due to the more stable structure of the nuclei, only the side chains are affected and are subjected to a more or less intense dealkylation according to the severity of the operating conditions.

When it is known that in steam cracking for example, the detrimental effects of pressure make it necessary to work at the lowest possible pressure and with very high steam dilution, it is remarkable that with hydrocracking it is possible to obtain such an easy gasification under pressure and at temperatures which, after all, are not excessive.

This particular feature of hydrocracking must be attributed to the presence of hydrogen which, unlike steam in the case of steam cracking, is actually involved in the radical reactions of decomposition.

The hydrogen also plays a favorable part in the conditions of cracking by counteracting unwanted condensation side-reactions and the formation of unstable polymers responsible for the phenomena of coking.

On the other hand, however, the presence of hydrogen enhances the formation of saturated products at the expense of the olefins, especially under pressure. Thus, contrary to the other destructive techniques, all the known hydrocracking processes, either catalytic or thermal, are characteristized by the absence or by the presence of generally small amounts of unsaturated products in the effluent.

From this point of view, hydrocracking is obviously at a disadvantage when olefin production is aimed at. In the case of ethylene and propylene for example, an additional operation of steam cracking becomes necessary in order to convert the intermediate saturated products obtained in a first hydrocracking stage.

It should be noted that with high hydrogen dilution, direct production of olefins is possible with excellent yields by operating at atmospheric pressure. However, the practical advantage of cracking carried out under these conditions is extremely limited. In fact, as compared with steam cracking, from which it only differs fundamentally in the substitution of hydrogen for steam, the volume of the gaseous effluents is considerably higher, and since it is necessary to compress these between 20 and 40 bars in order to fractionate them, the corresponding costs, already considerable in the case of steam cracking, are liable in this case to reach prohibitive levels.

It is therefore certain that in view of the favorable part played by the hydrogen in the pyrolysis and the economic drawback of low-pressure cracking, a process for making olefins, and in particular ethylene and propylene, operating under hydrocracking conditions, that is to say under hydrogen pressure, would constitute substantial progress as compared with existing technology provided that it makes it possible to obtain the desired olefins directly in commercially exploitable amounts and that the passage through the stage of saturated intermediate products is avoided or at least restricted. Although at first sight this may be surprising, such an aim is attainable in practice and can be attained by the process of the present invention.

The object of the present invention is therefore a method of thermal cracking under pressure and in the presence of an excess of hydrogen under conditions which ensure the direct conversion of a very wide range of hydrocarbon feedstocks, derived from crude oil or other origins, into lower molecular weight products, liquid and gaseous, in which the olefinic compounds are present in large and commercially exploitable proportions.

The applicants have found indeed that at high temperature, the reduction of residence time to levels substantially lower than those used at present time permits, in spite of the pressure and the presence of hydrogen, the reactions to be orientated towards a preferential production of light olefins relative to the corresponding saturated products, while considerably attenuating the degradation into methane.

Even for rates of conversion to $C_1$ to $C_3$ hydrocarbons comparable to those obtained with steam cracking, the effluent may contain at least as much ethylene as ethane and in the range of four times more propylene than propane. These proportions are however not limitative.

Under the operating conditions which will be specified below, and depending on the nature of the feedstock, the molar ratios of ethylene to ethane and of propylene to propane may vary, more generally, between 0.3 and 2 for the first and between 1 and 8 for the second.

From the thermodynamic point of view, it may be attempted to explain these apparently surprising results by assuming that a large proportion of saturated products results from the hydrogenation of intermediate olefins derived from primary cracking reactions, but that under the operating conditions of the invention the kinetics of hydrogenation of these olefins are substantially slower than that of their formation.

As hydrocracking can rarely be effected under isothermal conditions, it will be appropriate to characterize each operation by the temperature read at the outlet of the reactor, which is generally the maximum reaction temperature or differs very little from this temperature. It is known that the actual design of the reactor and the heating profile may have a non-negligible influence on the results, and therefore that the reactor outlet temperature is not sufficient to completely define the thermal state of the reaction system, but it is clear to those skilled in the art that this temperature may be considered as a reference indication of the severity of the cracking.

With regard to residence time, this will be defined as being the interval of time comprised between the moment at which the reaction products attain a temperature of about 600° C. and that at which they leave the reactor. For sake of simplicity, it will be calculated conventionally under conditions of pressure, temperature and composition at the outlet of the reactor, and expressed in seconds.

A fundamental feature of the hydrocracking process according to the invention is to operate under pressure but with very short residence times, namely in practice between 0.01 and 0.5 second and possibly below 0.1 second, while compensating if necessary for the adverse effect of the reduction of the residence time on conversion by an increase of the temperatures.

The temperatures may vary within wide limits, depending on the purpose of the operation and the duration of the reaction, the useful temperature range at the outlet of the reactor extending from 625 to 1000° C.

The pressure at the outlet of the reactor will be maintained at between 5 and 70 bars and still better between 10 and 45 bars.

With regard to hydrogen dilution, the quantities used must be such that the molar concentration of the latter in the reactor effluent is at least equal to 20%. High values of this concentration are favorable from the point of view of the overall conversion rate and as a means of prevention against the formation of coke generating tarry products, but at the same time they increase the tendency of hydrogenation of the intermediate olefinic products, as well as the volume of the gases in circulation and the hydrogen separation and recycling costs. A compromise must therefore be found for each particular case.

In the applications of the invention, it is in no way imperative that the hydrogen used should be pure. The hydrogen gas may contain other components without disadvantage, so long as these latter are inert with respect to hydrocarbons and to hydrogen itself under the operating conditions, or at least they do not give rise to undesirable reactions. This is especially the case with hydrocarbons ($CH_4$, $C_2H_6$, $C_2H_4$, $C_3H_8$, etc. . . .), carbon oxides (CO and $CO_2$), nitrogen, steam, small quantities of hydrogen sulfide, etc. . . . Some of these compounds may even be intentionally added, such as steam, hydrogen sulfide and light hydrocrackable hydrocarbons. If necessary, these products may be introduced into the hydrocarbon feed.

Amongst the industrial gases which may be used as such or after suitable purification, there may be cited:

the catalytic reforming hydrogen-rich off-gas;
the hydrogen fraction from ethylene production units;
the steam reforming gas;
the ammonia synthesis gas;
the dealkylation reactor off-gas;
coke oven gas, etc.

The favorable effect of hydrogen under pressure to prevent coke formation in certain catalytic or thermal reactions is well known, although the effectiveness of this means lessens at very high temperatures. Very short reaction times are from this point of view another favourable element which makes it possible not only to work at substantially higher temperatures, but also to treat a very wide range of feedstocks, including those containing large proportions of aromatics and even of olefins. In fact, even with heavy feedstocks at temperatures of 800° C. or higher, practically no fouling can be observed in the reactor itself when operating according to the invention.

However, when the effluent has an initial condensing temperature which is too high, a plug tends to form in the long run on cooling in the transfer line. This well known phenomenon is remedied by means of an efficient quenching system by injection of a fluid (aromatic oil, water, etc.) which rapidly reduces the temperature of the effluent below the dew point.

This great attenuation of coking brings an important additional advantage to hydrocracking under the conditions of the invention. Not only does it widen the range of feedstocks suitable for manufacturing light olefins, but it also makes it possible, either to hydrocrack again or to recycle certain fractions difficult to dispose of profitably, so that the yields are improved at the expense of troublesome by-products.

In steam-cracking, the carbon to hydrogen ratio of the feedstock is very important, not only because of its relation to the phenomena of coking, but also because the yields of light products depend on it. As a matter of fact, the proportion of light products formed depends on the quantity of hydrogen available. It can thus be seen that by operating under hydrogen pressure, the latter is able to compensate to a certain extent for any possible deficiency of hydrogen in the feedstock and to improve the results substantially. That is what is actually observed.

However, as regards the aromatics which are partly responsible for high values of the C/H ratio, in view of the fact that their nuclei have great thermal stability and are relatively refractory to the action of hydrogen under the operating conditions, their presence in the feed is only tolerated, unless they include side chains which are long enough to undergo hydro-dealkylation.

Apart from this restriction, alone or in mixtures, all distillable hydrocarbons having at least two atoms of carbon and preferably comprising between 3 and 30 carbon atoms, may advantageously be subjected to the hydrocracking according to the invention. Amongst the commercially available feedstocks, there may be cited: crude oil fractions extending from liquefied gases to heavy distillates, natural gasoline, catalytic reformates, either as such or after partial or total extraction of the atomatics, the products of hydrocracking, certain pyrolytic gasolines such as steam cracking gasoline, various specific hydrocarbons, and also mixtures of these various products.

The impurities, especially sulphur and nitrogen containing compounds which may be present in some of these feedstocks, do not interfere with hydrocracking and are for the greater part, decomposed under the conditions of the reaction. When the sulphur content is too high, its prior elimination may be justified; it is however desirable that this elimination should not be complete because sulphur compounds have a favorable effect against coking. When the used feedstocks are too poor in sulphur, it is even indicated to add to them small quantities of a sulphurizing agent, or alternatively to arrange matters so that the dilution hydrogen contains some hydrogen sulfide.

As regards the products obtained, when the feedstock is not very aromatic and when the operation is carried out at a high degree of severity, the $C_1$ to $C_4$ hydrocarbons are predominant. In certain cases, they may represent more than 90% of the total. The reduction of the residence time is accompanied, not only by an increase of unsaturated products, but also by a considerable reduction of the degradation to methane, the proportion of which with respect to the whole of the $C_1$ to $C_4$ hydrocarbons can be maintained without difficulty at a level of about 20% by weight, as long as extreme severity is not applied during cracking. The production of $C_2$ hydrocarbons which represent the potential ethylene, is substantially greater than that of $CH_4$; it also exceeds that of the $C_3$ hydrocarbons. Propylene is generally the most abundant individual component at a moderate degree of severity, but its production can be reduced considerably, if required, by increasing the temperature. The $C_4$ fraction is very rich in butenes and isobutene.

The constitution of the liquid products and the amounts produced depend considerably on the feedstock and on the severity of hydrocracking. Obviously the higher the aromatics content of the starting materials is the richer in aromatics the products are, but olefins are also present as well as vinyl-aromatics. An increase in the amount of aromatics as compared with that present in the feed is generally observed, which probably means that reactions of cyclization-dehydrogenation of paraffins and dehydrogenation of naphthenes take place in addition to a more or less intense dealkylation of alkyl-aromatics.

It should be noted that, as compared with steam cracking, the acetylenes and the di-olefins are in considerably smaller quantities, as are also the heavy condensed products.

As it has already been stated, an appreciable advantage of hydrocracking under the conditions of the invention is that it is possible to recycle large proportions of certain surplus cracked products, or even to hydrocrack them again in a separate reactor: such streams are the propylene fraction, the $C_4$ fraction, the cracked gasoline and even the heavier fractions. Experience has shown that these products can be recycled as they are after elimination of heavy residues, when so required. However, in order to eliminate all risk of eventual fouling in the preheating section, it may be considered better to subject them to a mild prior hydrogenation.

As an alternative, it is also possible to apply a similar hydro-treatment downstream the hydrocracking reactor in order to reduce at the same time the difficulties encountered during the fractionation of the cracked products.

In practice, the rate of recycling products may be adjusted to each particular case in order to avoid a useless build-up of aromatics. The general diagram of the process may be designed in such a manner that the product streams consist of a light aromatic fraction (similar to coke oven benzol) and possibly another fraction rich in naphthalene and alkyl-naphthalenes.

It will however be understood that in certain cases the direct utilization of certain co-products may be economically more attractive than recycling or recracking them. Apart from use in the chemical industry, use of the co-products as fuels doubtless provides the widest possibilities from this point of view. The $C_4$ fraction as well as the $C_3$ fraction, which may possibly be in excess, constitute excellent raw materials for alkylation. The gasoline fraction, suitably treated, can be used with advantage in motor fuels due to its high octane number; the fraction beyond 180–200° C., obtained with heavy feedstocks, can supply, after hydrogenation, an excellent base for jet fuels.

It will be noted that to the extent that such applications justify it, it is easy to increase the production of light liquid products by operating under milder conditions, for example between 625 and 700° C., with or without recycling or re-cracking certain fractions. The production of gas is then lower, but it is always possible to operate in such a way that the proportion of olefins may be preponderant.

The practical utilization of the gaseous co-products of hydrocracking does not create any major problem. Ethane, and possibly propane (after propylene-propane splitting) are to be considered apart, since they represent potential ethylene and propylene which add to the direct production of these olefins.

They will be converted, for example, in auxiliary steam-cracking furnaces. They may however also supply, in the same way as methane, thereof it is the ideal use, a hydrogen or synthesis gas manufacturing unit, for example by steam reforming. If no better use, the methane and possibly the surplus ethane or propane may be used as fuel. If there is no outlet available for propylene, the crude $C_3$ fraction may be recycled or hydrocracked again.

In this case however, and more generally when the demand for products other than ethylene is small, it may be more advantageous to try first to push the severity of hydrocracking, in other words the conversion into light products, to a maximum, so as to minimize the formation of co-products and to limit possible recycle operations.

In practice, the only variable on which it is possible to act in order to increase the severity to the desired extent, is temperature. With regards to residence time, for good results, it must be shortened when operating at higher heat levels, in order not to affect too unfavorably the selectivity into useful products, and so as not to enhance the degradation to methane.

The difficulty of carrying out a cracking operation under these extreme conditions of temperature and residence time is well known to those skilled in the art.

As a matter of fact, from the technical point of view, the temperatures which may be attained in cracking reactors are as much limited by the thermal behaviour of tube steels as by the magnitude of heat fluxes actually transferred to the reactants. The heat fluxes are in general very high, especially as a consequence of the very short residence times and of the endothermic nature of the reactions resulting in olefins.

In the particular case of cracking in the presence of hydrogen according to the invention, as a consequence of the unavoidable phenomena of hydrogenation, the reaction is generally less endothermic than in the case of purely thermal cracking, and may even be exothermic under certain circumstances. However, the desire to have maximum selectivity in olefins and therefore shorter residence times, makes it still more difficult to reach very high temperature levels in the case of hydrocracking.

At the risk of having a lower selectivity in olefins, the Applicants had the idea of allowing on the contrary, the hydrogenation reactions which normally have to be kept down, to evolve to a certain extent, so as to create an internal source of heat by virtue of the controlled exothermic action thus obtained, and to permit the reaction to develop to the desired temperature without being dependent on external heating conditions.

Although the heat levels accessible by this original and efficient means may readily exceed 1,000° C., it is found that by working preferably between 850 and 1,000° C., it is possible to obtain very advantageous yields of ethylene in spite of increased production of saturated products.

It is certain that the exothermic effect is obtained at the cost of increased consumption of hydrogen. For this particular mode of application of the invention, it thus becomes necessary to adopt a substantially higher hydrogen/hydrocarbon ratio compared with the case in which the hydrogenation phenomena have to be minimized.

Hydrogenation generally results in methane and ethane, but contrary to what may be feared, it is found that the formation of ethane is relatively large. What is still more unexpected is the increase in the rates of conversion to ethylene under these operating conditions which should normally favour the saturation of the olefins.

Finally, taking account of an additional ethane to ethylene cracking, the ultimate ethylene yields are very high; they may exceed 45% and even 50% in certain particular cases. If so desired, recycling may further improve these results.

Furthermore, the cracking of ethane supplies a large quantity of hydrogen which is sent back to the hydrocracking, resulting in a very substantial reduction in the net consumption of hydrogen.

It should be noted that recycling of olefinic fractions and more generally treating olefin containing feeds, is such as to facilitate the attainment of controlled exothermic conditions since, for identical yield patterns, the cracking of an olefinic hydrocarbon is less endothermic than that of the corresponding paraffin; it may even be exothermic in certain cases and is always such in the case of propylene.

Propylene constitutes in other respects a special case, since it cannot undergo cracking without coke formation, except in the presence of hydrogen. Its hydrocracking gives excellent rates of conversion into ethylene, especially in the extreme conditions of severity specified above. It is found however that it is preferable to carry out its hydrocracking in admixture with heavier hydrocarbons, since the rates of conversion are then higher.

It should also be noted the particular advantage which can be offered by the method of hydrocracking according to the present invention as an extension of a steam cracker in ethylene manufacturing facilities. The treatment by this means of all excess co-products of steam cracking, including the $C_3$ fraction, separately or in a mixture, gives great manufacturing flexibility to a unit of this kind, while increasing the yields of the products in greatest demand.

Whatever the manner the hydrocracking process according to the present invention is applied, in other words whether the operation is carried out under controlled exothermic or endothermic conditions, it is necessary in practice to supply heat to the reaction section.

This supply of energy to the preheated reactants may be effected either by exchange through the walls of a tubular reactor or by partial combustion *in situ*, or by mixture with superheated fluids such as hydrogen, steam, plasmas, combustion gases (for example the effluent from the post-combustion chamber of an ammonia-producing unit).

In the case of tubular reactors, and more particularly when operating under endothermic conditions, pressure and short residence times necessitate the supply of very large amounts of heat. This is a difficult technological problem, but numerous means exist in order to reach a valid solution, and *inter alia*:

(a) reduction of tube diameters;
(b) adoption of high flow velocities;
(c) increase of the temperature in the radiant section of the furnace;
(d) use of tubes with cores and annular passages for the gases, so as to increase the surface/volume ratio;
(e) dilution of the reactants, either by increased recycling (hydrogen, gaseous hydrocarbons, light aromatics), or by using an auxiliary fluid such as steam.

It should be noted that due to the pressure, the weight of the reactor is considerably reduced as compared with the case of a reaction at atmospheric pressure, and depends very little on tube diameter. In industrial practice, this allows very wide latitude in the choice of this dimension.

The same thing is true for the flow velocities of the reactants, since the pressure-drop is not critical for a reaction which is only slightly affected by pressure.

The description of the process and the preceding comments, with the diagram and the examples which will be given, make it possible to realize the large number of ways in which its integration is possible in a refinery or a petrochemical complex intended to manufacture large volume chemical intermediates such as olefins, aromatics, ammonia, etc.

The accompanying drawing illustrates in a diagrammatic manner a particular case of industrial application of the process according to the invention. As an addition, there has been indicated on this diagram the cracking of ethane and propane which helps in maximizing ethylene and propylene production, as well as the quench and the liquid co-product recycle or re-cracking lines. It must however be understood that the diagram is capable of various modifications using the various forms of execution which have been described above.

In this diagram, the hydrocracking section 2 receives the feedstock previously brought to the required pressure by the pump 1, and mixed at 11 with recycled hydrogen or recycled hydrogenating gas, and if so required at 12 with the recycled liquid products. The high pressure separator 3 permits the separation of the gaseous products 4 from the liquids 5 which supply respectively the units 6 and 7 which are intended to fractionate them after the usual treatments required in practice.

At 8 is shown an additional steam-cracking unit which processes on the ethane and propane discharged at 6, the cracked products going back to the gas fractionation section.

The hydrogen fraction, completed by hydrogen make-up at 9 for the case where the balance of hydrogen is in deficit, is recycled to the hydrocracking reactor through the pressure booster 10.

There is provided at 13 the possibility either of recycling into the initial circuit 1–2 or recracking in an additional reactor 14 the excess co-products coming from the fractionation sections 6 and 7.

If a quenching system is employed, the heavy oil used for that purpose, generally constituted by the heavy products of the hydrocracking, is injected at 15 immediately at the outlet of the hydrocracking reactor.

The examples are given by way of indication and do not have any restrictive nature. They are selected from numerous runs carried out in an experimental unit comprising an electrically-heated tubular reactor receiving the feedstock previously vaporized in the presence of hydrogen or hydrogen containing gas, and preheated to near 500° C. At the outlet of the reactor, the products are rapidly cooled and condensed.

In the cases where oil quenching is effected (examples 2, 3, 4 and 7), the latter is injected at the immediate outlet of the reaction tube. The products are separated at ambient temperature in a high pressure separator, giving a first gaseous phase containing the hydrogen and the major part of the gaseous hydrocarbons, and a continuously-extracted liquid fraction. When this latter fraction is pressure released, it liberates a gas rich in light hydrocarbons and leaves a liquid which will be fractionated and analyzed, as well as the two gaseous streams. The material balance of the operation is drawn up from the compositions thus determined and the flow-rates measured at the inlet and the outlet.

EXAMPLE 1

A kerosene sample having a distillation range of 150–283° C. containing 20% of aromatics (FIA method) was hydrocracked at a pressure of 21 bars absolute in presence of pure hydrogen and at 794° C. reactor outlet temperature. The residence time above about 600° C. was 0.085 second and the molar hydrogen dilution was 34.4% in the reactor effluent.

The yield pattern of the operation and also the characteristics of the charge and the essential operating conditions are summarized in the first column of Table I below.

EXAMPLE 2

A series of successive runs was carried out, using the same raw material as in example 1 above in admixture, each time, with the 150–250° C. fraction recovered from the previous hydrocracking run so as to approach a balanced condition. The results after the third recycling are indicated in the second column of Table I below, together with the operating conditions. The results are expressed with respect to the fresh feedstock and correspond to 25% recycled product in the reactor feed. The potential yield pattern of such an operation has also been indicated, with the further assumption of recycling the $C_4$ and $C_5$ hydrocarbons and taking into account the steam cracking of the ethane and propane co-produced.

EXAMPLE 3

A gas-oil with a distillation range of 165–345° C., containing about 25% of aromatics, was hydrocracked at a pressure of 21 bars absolute in presence of pure hydrogen at a temperature of 815° C. The residence time was 0.075 second and the molar hydrogen dilution in the reactor effluent was 42.5%.

The characteristics of the charge, the operating conditions and the yield pattern of the operation are indicated in the third column of Table I below.

EXAMPLE 4

Runs with recycling tests similar to those of example 2 were repeated with the gas oil of example 3 above, except that the recycled product comprised this time the 150–330° C. fraction instead of the 150–250° C. fraction. The results of the final operation for a feed mixture containing 24% of recycled products are summarized in the fourth column of Table I below, together with the potential yield pattern, further assuming the recycling of the $C_4$ and $C_5$ hydrocarbons and taking account of the steam cracking of the ethane and propane.

EXAMPLE 5

A light naphtha having a distillation range of 37–101° C. was hydrocracked at a pressure of 21 bars absolute, in presence of pure hydrogen and at a temperature corresponding to 810° C. at the reactor outlet. The residence time above 600° C. approx. was 0.12 second and the molar hydrogen dilution in the reactor effluent was 40%.

The yield pattern of the operation, together with the characteristics of the feedstock and the essential operating conditions are summarized in the first column of Table II below. In the second column is shown the potential yield pattern which may be reached when the maximum production of ethylene and propylene are desired, assuming the recycling of the $C_4$ and $C_5$ hydrocarbons and of a suitable part of the $C_6$ —200° C. fraction, and taking account of the steam cracking of the ethane and propane.

EXAMPLE 6

A mixture of naphthas and catalytic reformate, having 23% of aromatics and distilling at between 48 and 224° C. was hydrocracked at a pressure of 21 bars absolute at a temperature corresponding to 815° C. at the reactor outlet and in the presence of a dilution gas containing 72.9% of hydrogen, 14.5% of methane and 12.6% of ethane. The residence time and the hydrogen dilution were comparable to those of the previous example.

The operating conditions and the results obtained are summarized in the third column of Table II below. It is to be noted that the increase in the ethylene/ethane ratio results for the major part from dehydrogenation of a portion of the entering ethane.

As for the previous example, the fourth column of the Table gives the potential yield pattern, assuming the recycling of the $C_4$ and $C_5$ and of the $C_6$ —200° C. fraction with steam cracking of the ethane and propane.

EXAMPLE 7

A gas-oil having characteristics identical with those of example 3 was hydrocracked at a more moderate temperature and a higher pressure.

The operating conditions and the yield pattern of the operation are indicated in the first column of Table III.

EXAMPLE 8

A paraffinic oil with a distillation range of 160–380° C. and a specific weight of 0.864 was hydrocracked at 753° C. reactor outlet temperature and at a pressure of 21 bars absolute. The residence time was 0.075 second and the hydrogen dilution in the reactor effluent was 38%.

The data and results relating to this operation are shown in the second column of Table III below.

EXAMPLE 9

As hydrocracking at a relatively low temperature may be of advantage in certain particular cases, there have been included in the third column of Table III the results of a run carried out at 680° C. on a heavy fraction of gas-oil, having a specific weight of 0.843 and a distillation range of 248–375° C.

EXAMPLES 10 TO 12

These examples, shown in Table IV below, give quantitative evidence of the advantage of working at the highest possible temperatures, while keeping the residence times at very low levels when maximum ethylene production is desired.

The feedstock employed in Example 10 is identical with that of Example 5; that of Examples 11 and 12 is a heavy naphtha having a distillation range of 145–198° C. and a low aromatic content.

EXAMPLE 13

This example is shown in Table V and relates to hydrocracking at high temperature of a light gasoline derived from steam a cracker operated under moderate conditions. It shows in particular the excellence of the aromatic nature of the liquid fraction resulting from hydrocracking.

EXAMPLE 14

This example illustrates the advantage of hydrocracking under conditions of high severity applied to a feed containing a high proportion of propylene, namely in the case considered: 70 parts of propylene to 30 parts of the same naphtha as in examples 11 and 12 (see Table V).

For the examples 10 to 14, Table VI shows the ultimate yield patterns after steam cracking of the ethane co-produced. If it is so desired, the propylene-propane fraction and also certain heavier components of the hydrocracked products may be recycled or subjected to a second hydrocracking operation according to the invention, thus contributing to an improvement of the ultimate yields of ethylene.

There will be noted the substantial increase in the consumption of hydrogen when operating under the more severe conditions of the last five examples as compared with the previous examples.

The possibility of attaining very high degrees of severity under stable conditions of operation results finally from the control of this consumption. The results obtained by the Applicants show that this control is perfectly obtainable by suitably combining the quantities of hydrogen introduced and the residence times.

TABLE I

| Example No. | 1 | 2 | 3 | 4 |
|---|---|---|---|---|
| Liquid feedstock; Specific gravity at 20° C. | 0.800 | 0.819 | 0.821 | 0.832 |
| Distillation ranges: | | | | |
| Initial point, ° C | 150 | | 165 | |
| 10%, ° C | 169 | | 190 | |
| 50%, ° C | 198 | | 259 | |
| 90%, ° C | 257 | | 323 | |
| End point, ° C | 283 | | 345 | |
| Residue, percent | 3 | | 3 | |
| Content of aromatics, approximate, percent | 20 | | 25 | |
| Dilution gas | $H_2$ | $H_2$ | $H_2$ | $H_2$ |
| Operating conditions: | | | | |
| Pressure, bars | 21 | 21 | 21 | 21 |
| Reactor outlet temperature, ° C | 794 | 810 | 815 | 814 |
| Residence time at T>600° C., second | 0.085 | 0.115 | 0.075 | 0.090 |
| Mol. percent $H_2$ in reactor effluent | 34.4 | 39 | 42.5 | 36.1 |
| Weight balance, percent of fresh feed: | | | | |
| Methane | 12.9 | 13.0 | 15.8 | 17.4 |
| Ethylene | 12.7 | 14.6 | 13.8 | 14.7 |
| Ethane | 12.7 | 13.4 | 15.5 | 16.2 |
| Propylene | 13.8 | 16.7 | 13.3 | 16.1 |
| Propane | 3.9 | 4.5 | 3.9 | 4.7 |
| Total $C_1$ to $C_3$'s | 56.0 | 62.2 | 62.3 | 69.1 |
| $C_4$'s and $C_5$'s | 7.1 | 11.3 | 5.7 | 7.0 |
| $C_6$-150° C. gasoline | 11.3 | 16.9 | 9.2 | 13.4 |
| Distillate >150° C | 22.6 } 11.0 | | 14.5 } 10.4 | 12.3 |
| Residue >300° C | 4.3 | | | |
| Total $C_4+$ | 45.3 | 39.2 | 39.8 | 32.7 |
| Hydrogen consumption (m.³/100 kg), m.³ | 15 | 16 | 24 | 25 |
| Potential balance; After recycling of the $C_4$-$C_5$ hydrocarbons and steam-cracking of ethane and propane: | | | | |
| Methane, percent of fresh feedstock | | 18.1 | | 22.1 |
| Ethylene, percent of fresh feedstock | | 32.3 | | 32.9 |
| Propylene, percent of fresh feedstock | | 21.1 | | 19.2 |
| $C_6$-150° C. gasoline, percent of fresh feedstock | | 18.0 | | 14.0 |
| Heavy fraction, percent of fresh feedstock | | 11.3 | | 13.1 |
| Estimated net hydrogen consumption, m.³/100 kg | | 9-10 | | 15-16 |

NOTE.—Example No. 2, 75 parts fresh feedstock, 25 parts recycled 150-250° C. fraction. Example No. 4, 76 parts fresh feedstock, 24 parts recycled 150-330° C. fraction.

TABLE II

| Example No. | 5 | | 6 | |
|---|---|---|---|---|
| Liquid feedstock: | | | | |
| Specific gravity at 20° C | 0.663 | (¹) | 0.738 | (¹) |
| Distillation ranges: | | | | |
| Initial point, ° C | 37 | (¹) | 48 | (¹) |
| 10%, ° C | 47 | (¹) | 67 | (¹) |
| 50%, ° C | 59 | (¹) | 133 | (¹) |
| 90%, ° C | 81 | (¹) | 200 | (¹) |
| End point, ° C | 101 | (¹) | 224 | (¹) |
| Residue, percent | 1 | (¹) | 1.5 | (¹) |
| Content of aromatics, percent | <2 | (¹) | 23 | (¹) |
| Dilution gas | $H_2$ | (¹) | (²) | (¹) |
| Operating conditions: | | | | |
| Pressure, bars | 21 | (¹) | 21 | (¹) |
| Reactor outlet temperature, ° C | 810 | (¹) | 815 | (¹) |
| Residence time at T>600° C., sec | 0.12 | (¹) | 0.125 | (¹) |
| Mol. percent $H_2$ in reactor effluent | 40 | (¹) | 41.5 | (¹) |
| Weight balance, percent of fresh feed: | | | | |
| Methane | 11.4 | 22.6 | 11.3 | 17.9 |
| Ethylene | 11.3 | 38.8 | 11.2 | 27.9 |
| Ethane | 12.4 | | 8.8 | |
| Propylene | 17.2 | 30.9 | 13.9 | 20.4 |
| Propane | 4.0 | | 3.6 | |
| Total of $C_1$ to $C_3$ hydrocarbons | 56.3 | 92.3 | 48.8 | 65.5 |
| $C_4$ and $C_5$ hydrocarbons | 23.4 | | 9.6 | |
| $C_6$-200° C. gasoline | 20.0 | 6.5 | 37.8 | 29.7 |
| Heavy fraction | 0.8 | 1.5 | 4.4 | 5.3 |
| Total $C_4+$ | 44.2 | 8.0 | 51.8 | 35.0 |
| Estimated net $H_2$ consumption (m.³/100 kg.), m.³ | 6 | 3-4 | 7 | 6-7 |
| Aromaticity of the gasoline produced, percent | 25 | 75-80 | 75 | 80-85 |

¹ Potential balance percent of fresh feedstock, assuming steam cracking of ethane and propane, and recycling of $C_4$'s and $C_5$'s and part of the gasoline.
² 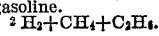

TABLE III

| Example No. | 7 | 8 | 9 |
|---|---|---|---|
| Liquid feedstock: | | | |
| Specific gravity at 20° C | 0.821 | 0.864 | 0.843 |
| Distillation ranges: | | | |
| Initial point, ° C | 165 | 160 | 248 |
| 10%, ° C | 190 | 294 | 264 |
| 50%, ° C | 259 | 356 | 300 |
| 90%, ° C | 323 | 378 | 357 |
| End point, ° C | 345 | 380 | 375 |
| Residue, percent | 3 | 2 | 2.5 |
| Dilution gas | $H_2$ | $H_2$ | $H_2$ |
| Operating conditions: | | | |
| Pressure, bars | 36 | 21 | 21 |
| Reactor outlet temperature, ° C | 773 | 753 | 680 |
| Residence time at T>600° C., seconds | 0.11 | 0.075 | 0.085 |
| Mol. percent $H_2$ in reactor effluent, percent | 34.7 | 38 | 44 |
| Weight balance, percent of liquid feed: | | | |
| Methane | 10.6 | 9.2 | 2.5 |
| Ethylene | 9.8 | 11.1 | 5.0 |
| Ethane | 12.0 | 9.2 | 3.3 |
| Propylene | 12.9 | 14.7 | 5.8 |
| Propane | 5.1 | 4.8 | 1.9 |
| Total of $C_1$ to $C_3$ hydrocarbons | 50.4 | 49.0 | 18.5 |
| $C_4$ and $C_5$ hydrocarbons | 9.4 | 13.2 | 6.9 |
| $C_6$-200° C. gasoline | 16.2 | 24.2 | 15.4 |
| 200-340° C. fraction | 19.5 | 11.9 | 55.7 |
| Residue | 5.6 | 2.9 | 3.5 |
| Total $C_4+$ | 50.7 | 52.2 | 81.5 |
| Hydrogen consumption (m.³/100 kg.), m.³ | 12 | 13 | 0.5 |

TABLE IV

| Example number | ²10 | ²11 | ²12 |
|---|---|---|---|
| Liquid feedstock: | | | |
| Specific gravity at 20° C | 0.663 | | 0.762 |
| Distillation ranges: | | | |
| Initial point, ° C | 37 | | 145 |
| 10%, ° C | 47 | | 157 |
| 50%, ° C | 59 | | 171 |
| 90%, ° C | 81 | | 187 |
| End point, ° C | 101 | | 198 |
| Residue, percent | <1 | | <1 |
| Content of aromatics, percent | <2 | | <5 |
| Operating conditions: | | | |
| Pressure, bars | 21 | 22 | 22 |
| Reactor inlet temperature, Te, ° C | 614 | 532 | 556 |
| Reactor outlet temperature, Ts, ° C | 891 | 880 | 910 |
| Residence time between Te and Ts, seconds | 0.090 | 0.078 | 0.077 |
| Dilution gas | $H_2$ | $H_2$ | $H_2$ |
| Mol. percent $H_2$ in reactor effluent, percent | 42.8 | 54.5 | 52.5 |
| Weight balance, percent of liquid feed: | | | |
| Methane | 32.0 | 25.0 | 32.9 |
| Ethylene | 18.8 | 16.6 | 19.1 |
| Ethane | 28.7 | 25.0 | 28.6 |
| Propylene | 8.4 | 9.8 | 4.2 |
| Propane | 2.3 | 2.9 | 1.1 |
| Total of $C_1$ to $C_3$ hydrocarbons | 90.2 | 79.3 | 85.9 |
| $C_4$ and $C_5$ hydrocarbons | 2.1 | 3.6 | 1.0 |
| $C_6$-200° C. gasoline | 9.6 | 17.2 | 14.4 |
| Heavy fraction | 1.4 | 3.0 | 3.0 |
| Total $C_4+$ hydrocarbons | 13.1 | 23.8 | 18.4 |
| Specific gravity of liquid collected | 0.903 | 0.880 | 0.905 |
| Bromine number of liquid collected | 30 | 40 | 27 |
| $C_6$ to $C_9$ aromatics of the $C_6$-200° C fraction, approximate percent | 94 | 91 | 96 |
| Hydrogen consumption, m.³/100 kg | 37 | 35 | 49 |

¹ Light naphtha.
² Heavy naphtha.

TABLE V

| Example number | ¹13 | ²14 |
|---|---|---|
| Liquid feedstock: | | |
| Specific gravity at 20° C | 0.770 | |
| Distillation ranges: | | |
| Initial point, ° C | 36 | (³) |
| 10%, ° C | 49 | (³) |
| 50%, ° C | 65 | (³) |
| 90%, ° C | 156 | (³) |
| End point, ° C | 194 | (³) |
| Residue, percent | <1 | (³) |
| Content of aromatics | (⁴) | (³) |
| Operating conditions: | | |
| Pressure, bars | 21 | 21 |
| Reactor inlet temperature, Te, ° C | 549 | 549 |
| Reactor outlet temperature, Ts, ° C | 888 | 925 |
| Residence time between Te and Ts, seconds | 0.083 | 0.066 |
| Dilution gas | $H_2$ | $H_2$ |
| Mol. percent $H_2$ in reactor effluent, percent | 48.7 | 36.5 |

TABLE V—Continued

| Example number | [1]13 | [2]14 |
|---|---|---|
| Weight balance, percent of liquid feed: | | |
| Methane | 15.8 | 26.1 |
| Ethylene | 8.0 | 22.4 |
| Ethane | 10.7 | 16.4 |
| Propylene | 5.5 | 17.8 |
| Propane | 1.3 | 3.9 |
| Total of $C_1$ to $C_3$ hydrocarbons | 41.3 | 86.6 |
| $C_4$ and $C_5$ hydrocarbons | 3.2 | 3.7 |
| $C_6$-200° C. gasoline | 52.1 | 10.8 |
| Heavy fraction | 5.0 | 2.5 |
| Total $C_4$+hydrocarbons | 60.3 | 17.0 |
| Specific gravity of liquid collected | 0.890 | 0.810 |
| Bromine number of liquid collected | 20 | 57 |
| $C_6$ to $C_9$ aromatics of the $C_6$-200° C. fraction, approximate | 97 | 85 |
| Hydrogen consumption, m.³/100 kg | 18 | 40 |

[1] Steam cracking gasoline.
[2] Heavy naphtha plus propylene.
[3] Proportions by weight: 70 parts of propylene to 30 parts of a heavy naphtha identical to that of examples 2 and 3.
[4] This is a light gasoline from a steam cracker operating under moderate conditions. Its content of $C_6$ to $C_9$ aromatics is about 36% and its bromine number is 55.

TABLE VI

| Example number | 10 | 11 | 12 | 13 | 14 |
|---|---|---|---|---|---|
| Weight balance after steam cracking of ethane, percent of liquid feed: | | | | | |
| Methane | 34.2 | 26.9 | 35.0 | 16.6 | 27.3 |
| Ethylene | 41.5 | 36.3 | 41.7 | 16.5 | 35.3 |
| Ethane | | | | | |
| Propylene | 9.1 | 10.4 | 5.0 | 5.8 | 18.2 |
| Propane | 2.4 | 3.0 | 1.2 | 1.3 | 4.0 |
| Total $C_1$ to $C_3$ hydrocarbons | 87.2 | 76.6 | 82.9 | 40.2 | 84.8 |
| $C_4$ to $C_5$ hydrocarbons | 2.6 | 4.1 | 1.6 | 3.4 | 4.0 |
| $C_6$-200° C. gasoline | 10.1 | 17.1 | 14.9 | 52.3 | 11.1 |
| Heavy fraction | 1.7 | 3.2 | 3.3 | 5.1 | 2.7 |
| Total $C_4$+hydrocarbons | 14.4 | 25.0 | 19.8 | 60.8 | 17.8 |
| Net hydrogen consumption, m.³/100 kg | 19 | 19 | 31 | 12 | 30 |

The present invention has been described in terms of specific examples, but it will be appreciated by those skilled in the art that changes and modifications are possible which do not depart from the spirit or scope of the inventive concepts taught herein.

What is claimed is:

1. A process for thermally cracking a hydrocarbon feedstock to convert it into lower molecular weight products containing large proportions of olefins comprising conducting said process in a heated reactor under superatmospheric pressures, ranging from about 10 bars to about 70 bars read at the reactor outlet, in the presence of hydrogen used in such amounts that its molar concentration in the effluent from the cracking section be not lower than 20%, at reactor outlet temperatures higher than about 625° C. to about 1100° C. and with residence times within the reaction section shorter than about 0.5 second down to about 0.005 second, adjusting said residence time in a decreasing manner with an increase of the cracking temperature, and providing an efficient means to control the extent of the destructive and hydrogenating action of hydrogen under pressure as well as the correlated heat effect, so that coking and useless over-hydrogenation of primary cracking products into paraffins are avoided, while obtaining controlled heat release capable of substantially reducing the over-all heat requirements of the cracking process.

2. The process of claim 1 wherein the reactor outlet pressure is in the range from about 10 to about 45 bars.

3. The process of claim 1 wherein the residence time within the reaction section is in the range from about 0.5 down to about 0.05 second and the reactor outlet temperature is in the range from about 670° C. to about 850° C.

4. The process of claim 1 wherein the residence time within the reaction section is in the range from about 0.2 down to about 0.01 second and the reactor outlet temperature is in the range from about 850° C. to about 1000° C.

5. The process of claim 1 wherein the residence time within the reaction section is in the range from about 0.1 down to about 0.01 second and the reactor outlet temperature is in the range from about 750° C. to about 900° C.

6. The process of claim 1 wherein the feedstock comprises hydrocarbons containing at least 3 carbon atoms and at most 30 carbon atoms, taken from the group consisting of paraffins, olefins, naphthenes, aromatics and mixtures thereof.

7. The process of claim 1 wherein hydrogen, as required, is added to the hydrocarbon feed as a hydrogen-rich gaseous stream with the hydrogen content of said gaseous stream being at least 50% vol., on a water-free basis.

8. The process of claim 1 wherein dilution steam is used.

9. The process of claim 1 wherein the feedstock comprises a hydrocarbon stream originating from an industrial cracking unit, said stream being taken from the group consisting of cracked gasolines, $C_3$ fractions, $C_4$ fractions and mixtures thereof.

10. The process of claim 1 wherein the feed to the reactor includes, in admixture with the fresh feedstock, recycled co-products from the claimed cracking process, said co-products being taken from the group consisting of the $C_3$'s, the $C_4$'s, the gasoline, heavier distilled fractions if any, and mixtures thereof.

11. The process of claim 1 applied in a secondary reprocessing reactor whereof the feed comprises a stream separated from the main reactor effluent, said stream being taken from the group consisting of the $C_3$'s, the $C_4$'s, the gasoline, heavier distilled fractions if any, and mixtures thereof.

References Cited

UNITED STATES PATENTS

| | | | |
|---|---|---|---|
| 2,912,475 | 11/1959 | Krause et al. | 260—683 |
| 3,641,183 | 2/1972 | Cahn et al. | 260—683 |
| 2,881,232 | 4/1959 | Linden et al. | 260—683 |
| 3,711,568 | 1/1973 | Cooper | 260—683 |
| 3,083,244 | 3/1963 | Sanford et al. | 208—107 |

FOREIGN PATENTS

| | | | |
|---|---|---|---|
| 209,676 | 8/1957 | Australia | 260—683 |
| 416,921 | 6/1933 | Great Britain | 260—683 |
| | | | 260—683 |

DELBERT E. GANTZ, Primary Examiner

C. E. SPRESSER, Jr., Assistant Examiner

U.S. Cl. X.R.

208—107, 128, 130